United States Patent [19]

Samyn

[11] Patent Number: 4,820,912
[45] Date of Patent: Apr. 11, 1989

[54] METHOD AND APPARATUS FOR CHECKING THE AUTHENTICITY OF DOCUMENTS

[75] Inventor: Johan Samyn, Roeselare, Belgium

[73] Assignee: N. V. Bekaert S.A., Zwevegem, Belgium

[21] Appl. No.: 910,153

[22] Filed: Sep. 19, 1986

[30] Foreign Application Priority Data

Sep. 19, 1985 [NL] Netherlands ............ 8502567

[51] Int. Cl.$^4$ .......................................... G01R 27/04
[52] U.S. Cl. ........................... 235/449; 235/482;
235/492; 324/58 A; 340/825.34; 283/70;
283/83
[58] Field of Search .............. 340/825.34, 825.35;
235/380, 435, 449, 487, 492, 491, 475, 480, 482;
283/70, 72, 74, 83; 324/58.5 R, 58.5 A, 58.5 B,
58 R, 58 A, 58 B

[56] References Cited

U.S. PATENT DOCUMENTS

| | | | |
|---|---|---|---|
| 4,255,652 | 3/1981 | Weber | 235/492 |
| 4,310,591 | 1/1982 | Lee et al. | 283/74 |
| 4,584,529 | 4/1986 | Aoyamo | 235/449 |
| 4,630,845 | 12/1986 | Sannee | 340/825.34 |
| 4,656,474 | 4/1987 | Mollier et al. | 340/825.34 |
| 4,729,128 | 3/1988 | Grimes et al. | 235/380 |

Primary Examiner—A. D. Pellinen
Assistant Examiner—Jeffrey A. Gall
Attorney, Agent, or Firm—Foley & Lardner, Schwartz, Jeffery, Schwaab, Mack, Blumenthal & Evans

[57] ABSTRACT

A method and an apparatus for checking the authenticity of documents, such as banknotes or credit-cards. The documents comprise a number of randomly distributed conductive fibres of which the distribution is scanned by microwaves and the response is transformed into a digital coded signal. A digital mark on the document, which is representative for the distribution of an individual document, is read off, transcoded, and compared with said coded signal for producing an approval signal. The use of a microwave scanning system in conjunction with documents having a random distribution of suitable fibres ensures a great repetitivity and security of the system.

11 Claims, 3 Drawing Sheets

8 µm - 5 mm - 0,05 %
 a

8 µm - 5 mm - 0,1 %
 b

8 µm - 5 mm - 0,2 %
 c

8 µm - 5 mm - 0,3 %
 d

8 µm - 5 mm - 0,5 %
 e

8 µm - 5 mm - 1 %
 f

METHOD AND APPARATUS FOR CHECKING THE AUTHENTICITY OF DOCUMENTS

BACKGROUND OF THE INVENTION

The invention relates to a method of checking the authenticity of documents made of a non-conducting material, such as paper or plastic, and having a physical characteristic of which the value randomly changes over a number of sub-areas of a checking area, each of said documents further comprising a digital mark which is characteristic for the distribution of said value over said sub-areas. Such documents are e.g. banknotes, passports, credit cards, bonds or other security papers. In some cases, the packing foil in which a product is enveloped, is also to be considered as a document of which the authenticity must be checked.

It is known to check the authenticity of such documents by scanning the checking-area of such documents for detecting the distribution of said value over said sub-areas, producing a digital scanning signal which is characteristic for such distribution as scanned, reading off said digital mark on said document and producing a digital mark-signal which is characteristic for the digital mark as read off, and comparing said scanning-signal with said mark-signal. In such methods the scanning is conducted by photo-electric means for detecting the distribution of the darkness of the surface of the document. It is also known per se to scan by means of a magnetic head for detecting the distribution of magnetic particles in the document.

An adapted scanning method, in order to ensure a maximum of security, has to combine an accurate repetitivity and a high resolution, i.e. capability to follow sharp variations over short distances. When a scanning system cannot follow such sharp variations, it will only be capable to distinguish two coarsely different patterns from each other, and will not be capable to distinguish two slightly different documents from each other. As a result, the documents are less individualized and falsification is easier.

Besides a high resolution, an accurate repetitivity of the scanning signal is also important. Because of magnetic prehistory or disturbing of magnetic fields or deformations of the document, the repetitivity of a magnetic scanning system is not ensured, whereas loss of brightness or colour or other damage of the document will disturb the repetitivity of a photo-electric scanning system. However, if the scanning system is not sufficiently repetitive, the risk that an authentic document would produce a slightly different scanning-signal and be identified as a falsification is not negligible. In these circumstances it is not possible to submit the scanning-signal to a severe criterion of identity with a given signal, and it has no sense to improve the resolution as long as the repetitivity is not also improved, and inversely.

SUMMARY OF THE INVENTION

It is an object of the present invention to provide for this checking method a scanning method in which a good resolution is combined with a very high repetitivity, in such a way that the scanning-signal can be submitted to very severe criteria for the approval of the document, despite of any wear or limited damage of the document.

The method according to the invention is characterized by the fact that documents are used comprising a number of particles with electromagnetic properties which are sensibly different from those of said non-conducting material of the document and which are randomly distributed in at least the checking area of the document, and that the scanning is conducted by means of a microwave bundle that impinges on said checking-area and by measuring the response microwave bundle.

Although a microwave bundle leaving a waveguide has a thickness dimension of at least half the wavelength, i.e. in the millimeter to centimeter range, it has surprisingly be found that the scanning allows sufficient resolution to divide the checking area in sub-areas of the order of 0.25 mm, and that the measured values for each sub-area are repetitive in the order of 2% of the maximum obtainable value. As a consequence, a checking area in the form of e.g. a rectilinear strip of 8 cm length allows the subdivision into 320 sub-areas, where the measurable value can be transformed into 1 out of 64 possible repetitive values. This means $64^{320}$ different possible combinations for the digital mark on the document. It is consequently very difficult for a falsificator to make a document with its randomly distributed particles and to affix different digital marks the one after the other and to try them out in a checking apparatus until he finds the right mark. On the other hand, if a falsificator tries to imitate an existing document, he may easily read out the mark from the authentic document and affix it on the falsified document, but he will not find a document with precisely the same distribution of particles on which he could affix the mark and which the scanner would not be able to distinguish as having a different distribution.

The particles used in the material of the document shall have different electromagnetic properties than the material of the document. This means a different dielectric constant $\beta$, or magnetic permeability $\mu$ or resistivity $\rho$ or other value influencing the microwave so that the response microwave bundle, i.e. the reflected bundle or the bundle which has traversed the document, has undergone a change, e.g. in amplitude or polarization, with respect to the bundle that impinges on the document, so that this change can be measured. The particles will preferably be in the form of electrical conducting fibers, and more specifically in the form of metallic fibers, distributed over said checking area in a proportion of less than 1 g/m². The length of the fibers will preferably be in the range of 0.5 to 15 mm and their diameter between 2 and 25 $\mu$m. Fibers shorter than 0.5 mm are less efficient and longer than 15 mm are more difficult to mix into the paper or plastic or other non-conducting material during its manufacturing. Fibers of less than 2 $\mu$m thickness would be well usable, but are not easy to manufacture, and if more than 25 $\mu$m thick, they would be visible and affect the aspect of the document. For non-round cross-sections, the "diameter" means the average diameter or thickness. The fibers are preferably made of stainless steel, but can also be made of carbon. Polymer fibers covered with a metal coating are also usable as conducting fibers.

The invention also relates to an appartus for conducting the above process, in which the apparatus comprises a checking station adapted for receiving such document, means for scanning the checking area of such document for detecting the distribution of such particles over a number of sub-areas of said checking area and for producing a digital scanning-signal which is characteristic for such distribution as scanned, means for producing a second digital signal and for comparing the latter with said scanning signal, which apparatus is characterized by the fact that said scanning means comprise an emitter of a microwave bundle directed towards the checking area of the document when in said checking station for producing a response microwave bundle, and a receiver of the response bundle, and that said apparatus further comprises means for reading-off said digital mark from said document when in said checking-station, the output of the latter means being connected to the input of said means for producing said second digital signal.

Preferably, the response microwave bundle which is to measure, is the bundle transmitted through the document. In this case, the checking station (or place where the position of the document is adapted to be checked) can be in the form of a transverse passage for the document through a waveguide between said emitter and receiver, and the scanning means comprise means for producing a rectilinear relative movement of the document through the passage. The scanning is then conducted over a rectilinear strip of the document, and the microwave bundle sweeps over subsequent sub-areas of this strip, which forms the checking area.

The digital mark is preferably in the form of a magnetic flux pattern in a magnetic strip of said document, which is read off by a magnetic reading-head. As the reading is in the form of a sequence of polarizations in one or in the other sense, and not in the form of quantities of magnetization, the danger of non-repetitivity of the reading of this strip is much less critical than any magnetic scanning of the document in order to reproduce the distribution of the fibers.

The invention also relates to the documents, as described above, which are specifically adapted for the present method, among which specifically the documents having the appearance of usual credit-cards, i.e. in the form of a stiff rectangular card of a length ranging from 8 to 12 cm and a width ranging from 4 to 8 cm and having a lengthwise running magnetic strip. Such card can be made of two or more subsequent layers of plastic and/or paper material, where e.g. only one inside layer comprises the fibers.

BRIEF DESCRIPTION OF THE DRAWINGS

The invention will now further be explained with reference to the drawings, given by way of example only, and in which.

DESCRIPTION OF THE PREFERRED EMBODIMENTS

Figure 1:
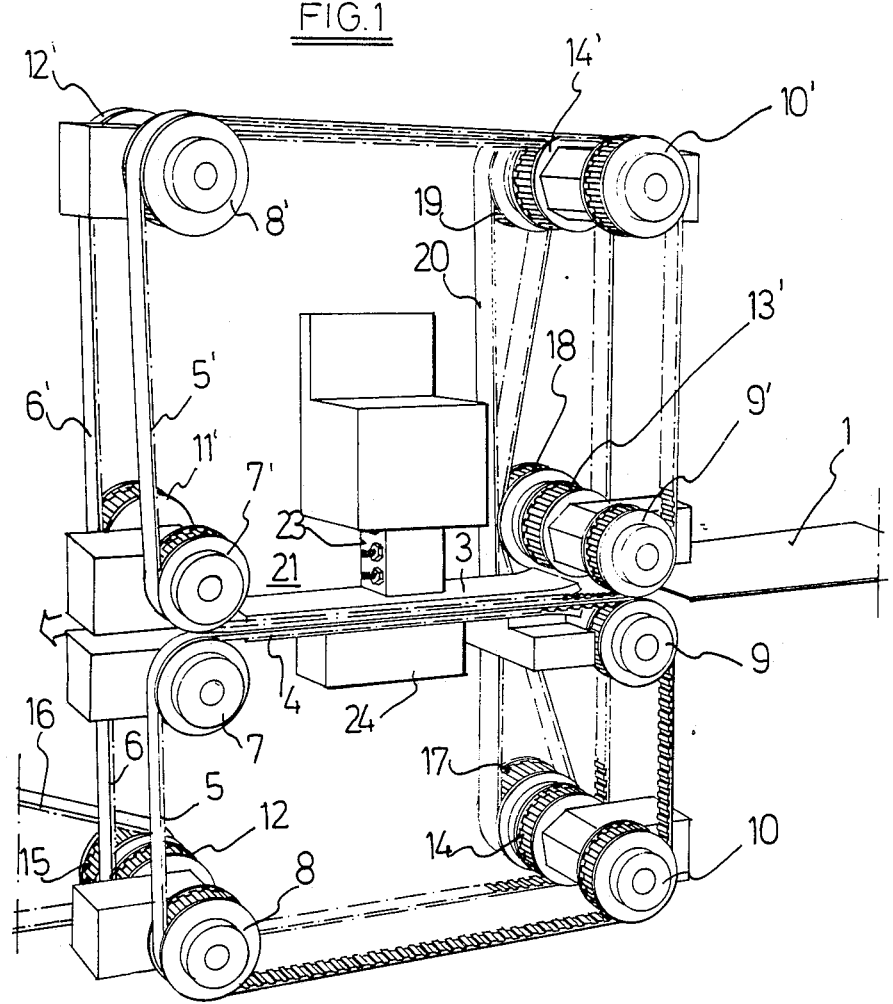
FIG. 1 is a perspective side-view of an apparatus according to the invention.
Figure 2:
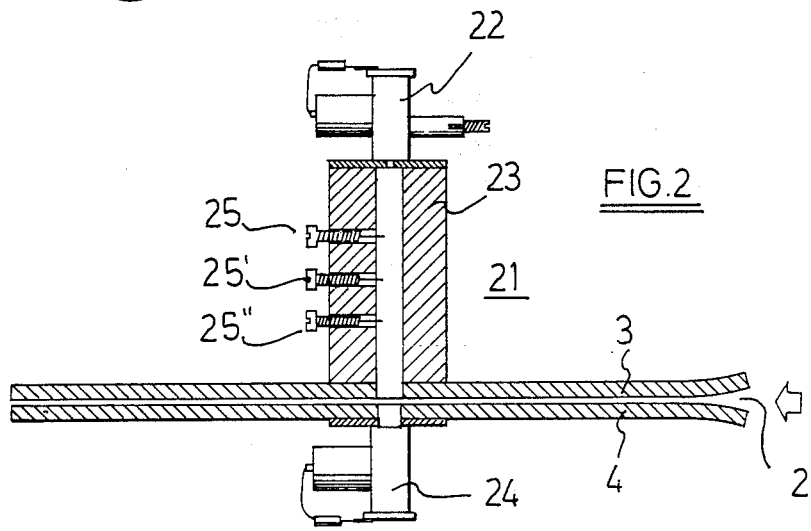
FIG. 2 shows a detailed transverse section of the checking-station and the microwave scanning means associated to this checking-station, as used in the apparatus of FIG. 1.

For the documents to check, a paper of the size of a banknote was used, having a weight of 80 g/m$^2$, a number of stainless steel fibers being embedded and randomly distributed over the whole paper. Different combinations of fiber thickness (8 $\mu$m or 12 $\mu$m), fiber length (3 mm or 5 mm), and fiber concentration (0.05% to 1%) were used. The document 1 is introduced in a slot 2 between two flat guiding plates 3 and 4, and leaves the apparatus at the left end of the guiding plates, as shown in FIGS. 1 and 2. On either side of each of the stationary guiding plates 3 and 4, there are two toothed flexible endless belts (5' and 6' respectively 5 and 6) running in parallel with the guiding plates, the belts 5, 5' and 6, 6' being pressed respectively against each other for ensuring the transport of the document through slot 2. The flexible belts are each led around four toothed wheels 7, 8, 9, 10; 7', 8', 9', 10'; 12, 14; 11', 12', 13', 14'. The four toothed wheels 7', 8', 9', 10' for belt 5' are fixed in pairs on the same rotation-axle with the four toothed wheels, respectively 11', 12', 13' and 14', for belt 6', in order to ensure synchronism between belts 5' and 6', and the same is done with the toothed wheels for belts 5 and 6. A toothed wheel 17, fixed on the axle of one of the pairs of toothed wheels for belts 5 and 6, connected with toothed wheel 18, fixed on the axle of one of the pairs of toothed wheels for belts 5' and 6' for driving the latter belts by means of an endless belt 20 which is toothed on either side, ensures the synchronism between belts 5, 6 on one hand and belts 5' and 6' on the other hand (Wheel 19 is freely rotatable around its axis). The whole is driven by an endless belt 16, engaging with toothed wheel 15 which is fixed on the axle of wheels 8 and 12, and this endless belt 16 is driven by a motor (not shown).

The belts 5, 6, 5', 6' transport the document with a constant speed along a detection apparatus 21. It is clear that many other sorts of transport means for paper documents can be designed for producing the movement along the detection apparatus. For stiff documents of small size in card form, such as credit cards, the transport means can e.g. largely be simplified by passing the card between pairs of rollers. It is also possible to have a stationary checking-station, where the microwave-beam will sweep along the document. It is sufficient to create a relative movement between the detection appartus and the document, allowing the scanning of subsequent sub-areas of the checking area of the document.

The detection apparatus 21 (FIG. 2) comprises a microwave oscillator 22, e.g. a Gunn-diode, a waveguide 23 connected to said oscillator and a microwave receiver 24, e.g. comprising e.g. a Schottky diode. As shown on FIG. 2, the waveguide 23 which connects the oscillator with the receiver is directed perpendicularly through the guiding plates 3 and 4, and at the crosspoint, the plates are provided with an opening or window of the same transverse dimension of the waveguide. In this way, a transverse passage for the document through the waveguide is provided and the receiver is able to measure the amplitude of the microwave after traversing the document. In order to change the microwave pattern in the waveguide and in said window, so as to obtain an optimal detection of the fibers, the waveguide 23 is provided with a number of tuning-screws 25, 25' and 25". The necessity of such tuning can however, if desired, also be avoided when the receiver is provided with an isolator for preventing the waves which have entered the receiver to reflect back into the waveguide again, as well known in the art of microwaves.

The amplitude of the microwave after traversing the document is representative for the presence of one or more fibers. It is however also possible to put the receiver on the same side of the guiding plates as the emitter, in order to measure the radiation reflected by the fibers. The emitted microwave radiation can be polarized in one direction, e.g. in the preference direction of the fibers in the paper, if any, but can also be circularly polarized so as to be equally sensible to all fibers, independently from their direction in the document.

Figure 3:
FIG. 3 and 4 show a number of diagrams of signals, produced by the microwave receiver when checking the checking-area of a document passing through the checking-station of FIG. 1, for different combinations of fiber length, fiber thickness and fiber concentration in the documents passing through the checking-station.
Figure 3:
Figure 3:
Figure 3:
Figure 3:
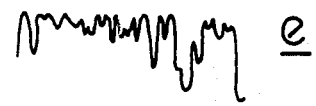
Figure 3:

FIG. 3 shows 6 types of response patterns (a to f), obtained by the receiver 24 of the apparatus according to FIG. 1, working at a frequency of 24.15 GHz and transmitting a wave in a $TE_{1,0}$-mode through the waveguide 23 of the type WR42 (rectangular 10.668 mm by 4.318 mm) for papers of different combinations of concentration, thickness and length of the fibers as mentioned above.

In FIG. 3, the length and thickness of the fibers is kept constant, and the concentration is varied from 0.05% to 1% (percentages by weight). In FIG. 3a the concentration is so low, that the respose pattern comprises a large horizontal part and this brings down the possibilities to distinguish a great number of patterns from one another. The same occurs for the high concentration of FIG. 3f, where the response pattern comprises a large horizontal maximum part. Between both concentrations an optimum can be sought. It is clear that in each case the optimum concentration will depend on the used wavelength and the size of the fibers and that this will in general lie below 1 g/m$^2$.

Figure 4:
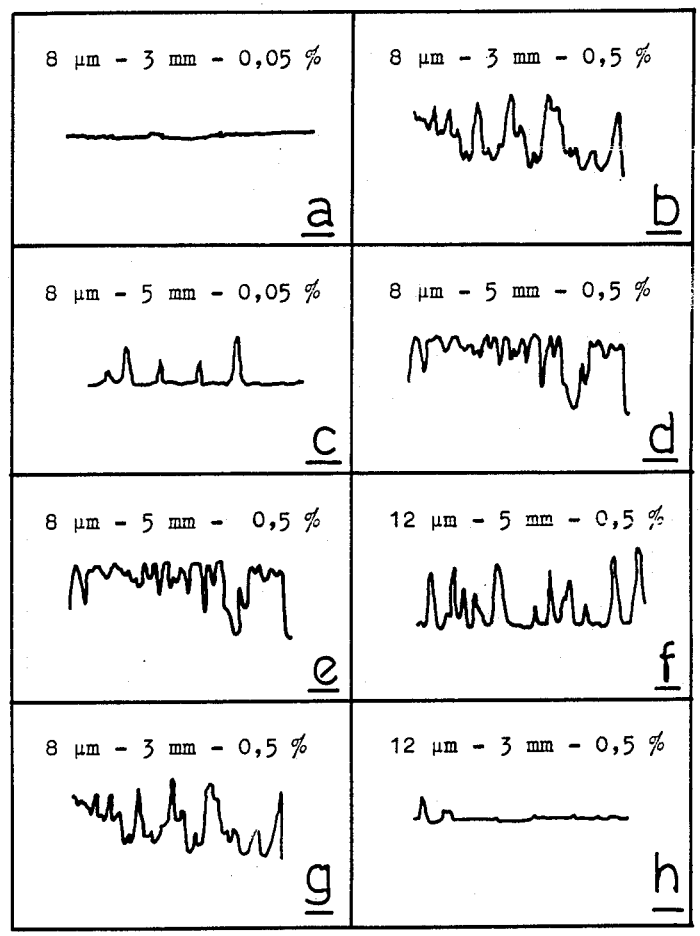

The receiver is less sensible indeed to fibers of less than a quarter wavelength and the sensibility shows a small peak at a quarter wavelength, and further raises to a higher peak at a half wavelength. This makes that, the more the fiber length is in the range of higher sensibility, the lower the optimum concentration will be. This is shown in FIG. 4 a to d, where it is shown that, for a fiber length of 3 mm, a high concentration above 0.5% will be desirable, whereas for a fiber length of 5 mm, the optimum will lie between 0.05 and 0.5%. This makes that, for the suitable wavelengths, the fiber length will preferably range from 5 mm to 15 mm, although shorter fibers in the range of 0.5 to 5 mm, and less efficient, can also be mixed in the material for the documents.

The influence of the fiber diameter is shown in FIG. 4, e to h. For a same weight and length of the fibers, there are less fibers. It is consequently clear that the sensibility of the receiver for a given weight of fibers, will be lower for thicker diameters, and that the optimum percentage will raise according as the diameter is higher.

The response signal of the receiver 24 is further, in a way well known to those skilled in the art, transformed into a digital scanning signal. To this end, the obtained signal is e.g. divided in 128 abscissa-positions. For each position, the ordinate is transformed in a digital value which ranges between 0 and 63 and this needs 6 binary code bits. For the 128 abscissa positions in total, a binary word of 6×128 bits will then be representative for the obtained response signal or for the distribution of the fibers over 128 sub-areas of the strip-form part of the document which has passed the said window between the emitter and the receiver. This converter of the analog signal of FIG. 3 to a digital scanning signal forms part of the scanning system and can be realized according to various principles in various possible systems, and its details are not of importance for this invention. The only important feature is, that the receiver 24 produces such repetitive response signal, that a safe subdivision of the ordinate into 64 values and even more, appears to be possible, and that there is sufficient resolution for checking the abscissa in 128 positions.

The document 1 to check, is further provided with a digital mark which has a univocal relationship, according to a secret transcoding formula, with the digital scanning signal, obtained when scanning the document with the scanning system. This digital mark can be put on the document in the form of e.g. readable printed figures, a bar code, perforations, a programmed integrated circuit or a magnetic strip which can be read off with a magnetic reading-head. In order to bring the digital mark on the document to check, the document is introduced in a scanning system for producing said digital word, and the output of the scanning system is connected to a transcoder and further to e.g. a magnetic writing head for writing the transcoded word into a magnetic strip on the document. Other parts of the magnetic strip can then be reserved for other data. In this way, the digital mark, as introduced on the document, is also characteristic, over a certain transcoding formula, of the distribution of the fibers over the 128 sub-areas of the checking area of the document. If not necessary, the transcoding formula can be reduced to its simplest form, i.e. identity between the digital scanning signal and the digital word which has been put on the document.

The apparatus according to claim 1 further comprises the necessary means (not shown) for reading the digital mark on the document. In dependence of the nature of the mark, this may be an optical figure reader, an optical bar code reader, or a magnetic reading-head. The output of this reader is then connected to a comparator (not shown), where the mark-signal, as read off, is firstly transcoded and compared with the digital scanning-signal obtained from the scanning system. The comparator with its transcoder can be designed in various forms according to various principles, which are well known by those skilled in the art and are not of importance for this invention. Only when the scanning signal corresponds to the transcoded mark signal, the comparator will produce an output-signal, which can be used as an indication that the checked document is authentic.

It is clear that other scanning means, using a microwave bundle which impinges on the document can be designed, in so far as they allow to measure a response bundle which keeps apart the measurements for the different sub areas, without departing from the scope of this invention. It is also clear that the digital signals and marks can be coded in any sort of code, either purely binary, or binary coded decimal or other. The non-conducting material for the document can be paper or plastic or any other material, in so far as it doesnot reflect the microwave energy to such extent that the detection of the fibers would no longer be possible.

What is claimed is:

1. A method of checking the authenticity of documents, made of a non-conducting material and having a physical characteristic of which the value randomly changes over a number of sub-areas of a checking-area, and further comprising a digital mark which is characteristic of the distribution of said value over said sub-areas, the method comprising scanning said checking-area of such document for detecting the distribution of said value over said sub areas, producing a digital scanning signal which is characteristic of such distribution as scanned, reading said digital mark on said document and producing a digital mark-signal characteristic of the digital mark as read, and comparing said scanning signal with said mark signal, characterized by the use of documents comprising a number of particles with electromagnetic properties which are sensibly different from those of said non-conducting material and which are randomly distributed in at least said checking area, and that said scanning is conducted by means of a microwave bundle impinging on said checking-area and producing a response microwave bundle and by measuring said response bundle.

2. A method according to claim 1, characterized by the use of documents with particles in the form of electrical conducting fibers.

3. A method according to claim 2, characterized by the use of documents with particles in the form of metallic fibers of a length ranging from 0.5 to 15 mm and a diameter ranging from 2 to 25 $\mu$m.

4. A method according to claim 3, characterized by the use of documents with particles in the form of stainless steel fibers which are randomly distributed over said checking area in a density of 1 g/m$^2$.

5. A method according to claim 1, in which the response microwave bundle is the bundle after traversing said document.

6. A method according to claim 1, including the scanning of the document over a rectilinear strip part of said document, by producing a rectilinear relative movement between the microwave bundle and the document, so that the bundle sweeps over subsequent sub-areas of said document.

7. A method according to claim 6, in which a digital mark is used in the form of a magnetic flux pattern in a magnetic strip of said document.

8. A method according to claim 1, in which a document is used in the form of a rectangular card of a length ranging from 8 to 12 cm and a width ranging from 4 to 8 cm, having a lengthwise running magnetic strip.

9. An apparatus for checking the authenticity of documents made of a non-conducting material comprising a number of particles with electromagnetic properties which are sensibly different from those of said non-conducting material and which are randomly distributed in at least a checking area of such document, the documents being provided with a digital mark, the apparatus comprising a checking station means for receiving such document, means for scanning the checking area of such document for detecting the distribution of such particles over a number of sub-areas of said checking area said scanning means comprising an emitter of a microwave bundle directed towards the checking area of the document when in said checking station for producing a response microwave bundle, and one receiver means of the response bundle for providing a repetitive response signal and obtaining a sufficient subdivision of ordinate and abscissa values for resolution and checking the positions thereof.

10. An apparatus according to claim 9, in which said checking station is in the form of a transverse passage for the document through a waveguide between said emitter amd receiver, and that said scanning means comprise means for producing a rectilinear relative movement of the document through said passage.

11. An apparatus according to claim 9, in which said reading-off means comprise a reading-head of a magnetic flux pattern in a magnetic strip.

* * * * *